United States Patent
Agrawal et al.

(10) Patent No.: US 10,794,179 B2
(45) Date of Patent: *Oct. 6, 2020

(54) POROMECHANICAL IMPACT ON YIELD BEHAVIOR IN UNCONVENTIONAL RESERVOIRS

(71) Applicant: CONOCOPHILLIPS COMPANY, Houston, TX (US)

(72) Inventors: Samarth Agrawal, Houston, TX (US); Richard A. Albert, Houston, TX (US)

(73) Assignee: ConocoPhillips Company, Houston, TX (US)

(*) Notice: Subject to any disclaimer, the term of this patent is extended or adjusted under 35 U.S.C. 154(b) by 104 days.

This patent is subject to a terminal disclaimer.

(21) Appl. No.: 16/046,419

(22) Filed: Jul. 26, 2018

(65) Prior Publication Data

US 2019/0093477 A1  Mar. 28, 2019

Related U.S. Application Data

(60) Provisional application No. 62/537,118, filed on Jul. 26, 2017.

(51) Int. Cl.
*E21B 49/00* (2006.01)
*E21B 47/06* (2012.01)
(Continued)

(52) U.S. Cl.
CPC .............. *E21B 49/00* (2013.01); *E21B 43/26* (2013.01); *E21B 47/06* (2013.01); *G01V 1/306* (2013.01);
(Continued)

(58) Field of Classification Search
CPC .......... E21B 49/00; E21B 43/26; E21B 47/06; E21B 43/267; G01V 1/306; G01V 99/005; G01V 2210/646
See application file for complete search history.

(56) References Cited

U.S. PATENT DOCUMENTS

| 2005/0073910 A1 | 4/2005 | Cole et al. |
| 2015/0176394 A1 | 6/2015 | Roussel et al. |

(Continued)

OTHER PUBLICATIONS

Stanislavsky, Eyal, et al—"A theoretical model for reverse water-level fluctuations induced by transient permeability in thrust fault zones", 2003, Earth and Planetary Science Letters, 210, pp. 579-586, Elsevier, 8 pgs.

(Continued)

*Primary Examiner* — Yong-Suk Ro
(74) *Attorney, Agent, or Firm* — Polsinelli PC

(57) ABSTRACT

A method for obtaining hydrocarbon from a reservoir in a subterranean formation can include measuring a poromechanic pressure change due to lithostatic load sharing in the subterranean formation. The poromechanic pressure change can then be mapped to one or more locations within the subterranean formation. Once mapped, the method can identify one or more local pressure peaks in the poromechanic pressure change, wherein each of the one or more local pressure peaks are marked by a pressure escalation and subsequent pressure depletion. The method can then determine one or more regions within the reservoir exhibiting single phase hydrocarbon production.

18 Claims, 8 Drawing Sheets

(51) Int. Cl.
    *G01V 99/00*     (2009.01)
    *G01V 1/30*     (2006.01)
    *E21B 43/26*     (2006.01)
    *E21B 43/267*     (2006.01)

(52) U.S. Cl.
    CPC .......... *G01V 99/005* (2013.01); *E21B 43/267* (2013.01); *G01V 2210/646* (2013.01)

(56) References Cited

U.S. PATENT DOCUMENTS

| | | | |
|---|---|---|---|
| 2016/0237799 A1 | 8/2016 | Dawson | |
| 2016/0340573 A1* | 11/2016 | Semenov | C09K 8/62 |
| 2018/0003033 A1* | 1/2018 | Dawson | E21B 47/06 |

OTHER PUBLICATIONS

International Search Report, PCT/US2018/043904, dated Sep. 28, 2018, 2 pgs.

Berg, Steven J., et al—"Estimating Hydraulic Parameters When Poroelastic Effects Are Significant", 2011, Ground Water, National Groundwater Association, vol. 29, Issue No. 6, doi: 10.1111/j.1745-6584.2010.00781.x, pp. 1-15; 15 pgs.

Bosl, William, et al—"Crustal Fluids and Earthquakes", 2000, Geophysics Department, Stanford University, American Geophysical Union, GeoComplexity and the Physics of Earthquakes, Geophysical Monograph 120, pp. 267-284; 18 pgs.

Hong, S.H.—"Cryer's Sphere Problem—GEOFEA Revisits", 2010, GeoSoft Pte Ltd; 4 pgs.

Verruijt, Arnold—"Consolidation of Soils", 2005, Encyclopedia of Hydrological Sciences, John Wiley & Sons, Ltd., DOI 10.1002/0470848944.hsa303; 17 pgs.

Wong, Tai T., et al—"A numerical study of coupled consolidation in unsaturated soils", 1998 NRC Canada, Can. Geotech J. 35, pp. 926-937; 12 pgs.

Yin, S, et al—"Assessment of the Noordbergum effect with the complete overburden reaction considered", 2016, ResearchGate Jan. 20, 2016, 8 pgs.

* cited by examiner

POROMECHANICAL IMPACT ON YIELD BEHAVIOR IN UNCONVENTIONAL RESERVOIRS

CROSS-REFERENCE TO RELATED APPLICATIONS

This application is a non-provisional application which claims benefit under 35 USC § 119(e) to U.S. Provisional Application Ser. No. 62/537,118 filed Jul. 26, 2017, entitled "POROMECHANICAL IMPACT ON YIELD BEHAVIOR IN UNCONVENTIONAL RESERVOIR," which is incorporated herein in its entirety.

FIELD OF THE INVENTION

The present invention relates generally to recovery of hydrocarbons from an unconventional reservoir. More particularly, but not by way of limitation, embodiments of the present invention include tools and methods for mapping poromechanic pressure changes in a subterranean formation which can be used to optimize a production strategy.

BACKGROUND OF THE INVENTION

Unconventional reservoirs (UR) typically require massive stimulation or special recovery processes in order to produce oil and gas at economically viable flow rates. Compared to conventional reservoirs, unconventional reservoirs are large in volume and difficult to develop. Examples of unconventional reservoirs include, but are not limited to, low permeability oil, tight gas sands, gas shales, heavy oil, coalbed methane, gas hydrates, and oil shales.

BRIEF SUMMARY OF THE DISCLOSURE

The present invention relates generally to recovery of hydrocarbons from an unconventional reservoir. More particularly, but not by way of limitation, embodiments of the present invention include tools and methods for mapping poromechanic pressure changes in a subterranean formation which can be used to optimize a production strategy.

One method of obtaining hydrocarbon from a reservoir in a subterranean formation includes measuring a poromechanic pressure change due to lithostatic load sharing in the subterranean formation; mapping the poromechanic pressure change to one or more locations in the subterranean formation; identifying one or more local pressure peaks in the poromechanic pressure change, wherein the one or more local pressure peaks are each marked by a pressure escalation and subsequent pressure depletion; and determining one or more regions in the reservoir exhibiting single phase hydrocarbon production.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Figure 1:
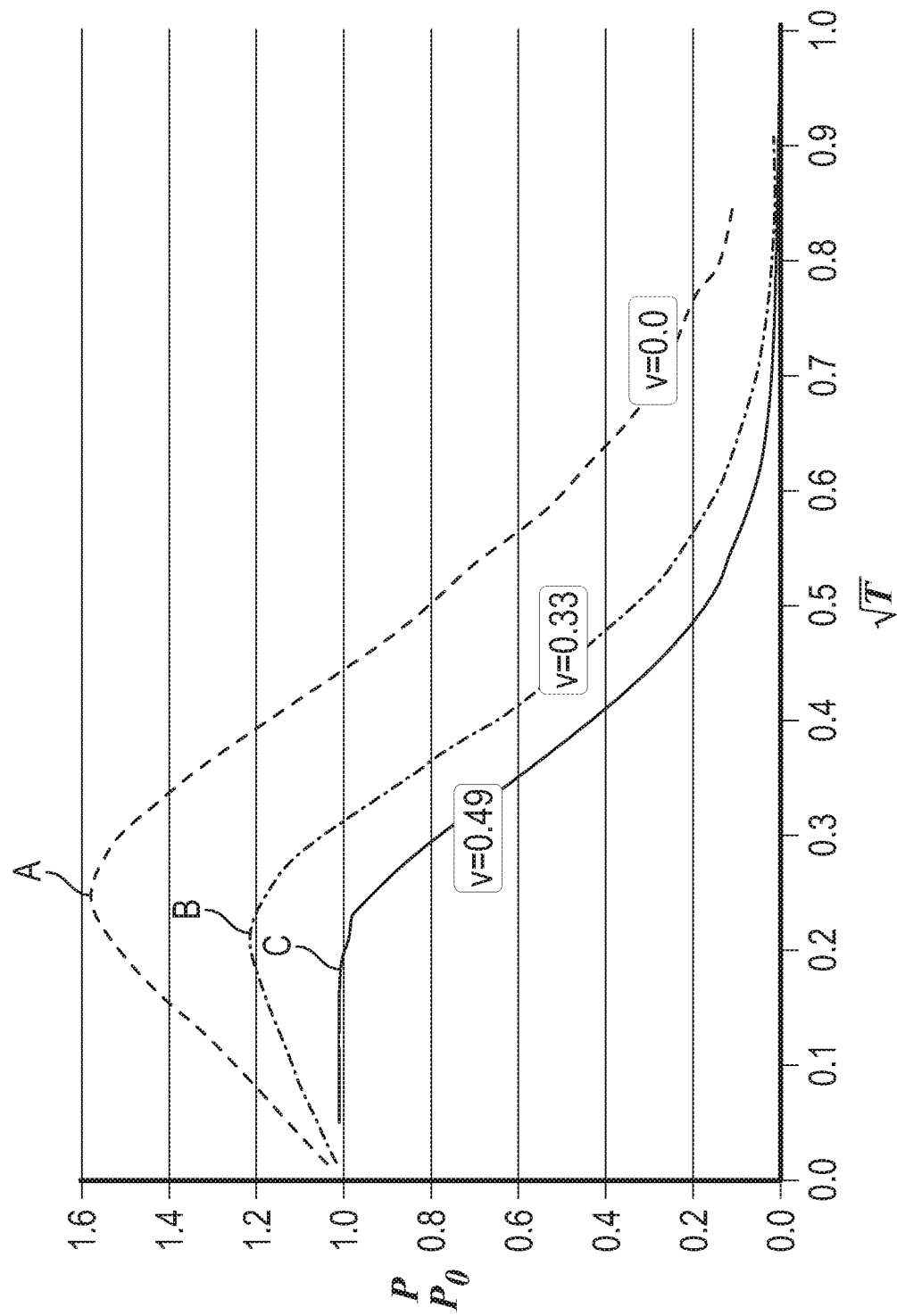
FIG. 1 illustrates pressure escalation and pressure depletion according to one or more embodiments of the present invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Pressure depletion in a draining well can provide challenges to recovering hydrocarbons. Liquid dropout from the gas phase when reservoir pressure falls below saturation pressure should impair well productivity due to relative permeability effects. When pressure drops below the dew point, condensate forms a bank of fluid in the reservoir that can hamper deliverability. One would expect that when a reservoir is being drained, pore pressure will only go down from its initial value. However, this is not always true for all parts of a reservoir.

Some unconventional reservoir wells have reported delayed onset of multiphase effects as measured using changes in condensate gas ratio (CGR) in the surface-produced flow stream. This delay in CGR change can be attributed to pressure escalation/support due to the so-called Mandel-Cryer effect. Previously, Mandel and Cryer independently observed similar anomalous pressure escalation responses during a fluid drainage event. This pressure escalation may be analogous to reverse water fluctuations known as the Noordbergum effect, first observed by Dutch scientists. As one part of a water reservoir was drained, other parts experienced a pressure escalation observable as change in water levels due to overburden load sharing.

However, this pressure escalation was largely ignored in conventional highly permeable reservoirs since the effect was short lived and low in magnitude. However, this effect becomes greater when rocks have low permeability (nano Darcy to micro Darcy) as found in many unconventional reservoirs. This effect may be particularly accentuated when the rock is characterized by a low Young's modulus (less than about 2.5 MM psi), low Possion ratio (about 0.15 to 0.2), and low permeability (less than about 200 nD).

There are many potential commercial applications of the present invention. Being able to predict the expected delay in multiphase CGR onset can help asset engineers make more reliable reserves forecasts. For example, if the condensate yield starts declining after 2 years rather than 5 years, the net present value (NPV) of the well will be vastly different, when considering the price differential between gas and liquids. An engineer can also utilize this knowledge to design an optimal drawdown/choke operating strategy for unconventional reservoir wells in condensate areas where this phenomenon is anticipated. For exploration/appraisal leases, application of these concepts can help high-grade areas where this phenomena can be leveraged with given mechanical and flow properties of the reservoir rock. Moreover, the pressure signals depend on production-induced effects and are therefore a long term signal. This eliminates the risk of missing essential information such as in methods utilizing stimulation period data.

The invention provides systems and methods for utilizing coupled fluid flow and poromechanical physics to understand why the CGR of a produced fluid may show delayed multiphase onset in certain reservoirs but not others. In the past, advanced coupled flow and geomechanics physical concepts have often been deemed inapplicable in oil and gas reservoir modeling. While this is somewhat true in conventional reservoirs (high permeability), unconventional reservoirs can exhibit far different behavior, particularly when marked by ultra low permeability and low Young's modulus.

As described herein, the term "poromechanical" and its related terms refer to the branch of physics that deals with behavior of a fluid-saturated porous medium. The porous medium refers to a framework of solid material with some internal, voided pore space, connected or otherwise, that may contain fluid in liquid or gaseous form. Both the solid and the void space fluids have unique physical properties which often leads to counter-intuitive physical phenomena when exposed to external forces as a system rather than only solid or fluid.

The present invention can help estimate the magnitude of a pressure escalation and its duration due to load sharing from another part of the reservoir which is being drained. The period for which pressure stays above the initial reservoir pressure is essentially a time offset for the onset of regular multiphase effects to be expected in the absence of the Mandel-Cryer effect. The magnitude of pressure escalation dictates the absolute impact on hydrocarbon pressure-volume-temperature (PVT) and can also be used for drainage diagnostics. This allows one to prioritize plays and sweet spots where this effect could be leveraged to improve asset NPV.

One of the goals of the present invention is to understand the poromechanical mechanisms that lead to delayed CGR changes. Without understanding the poromechanical physics, reservoir engineers would be forced to tweak history match models using non-physical values and are unable to make reliable production forecasts or design an optimal well operating strategy. Thus, one of the advantages of the present invention is that it allows reservoir engineers to design an optimal drawdown strategy which impacts well and fracture cleanup as well as ultimate resource recovery.

Without being limited by theory, it is believed that the delay in CGR trends observed in producing wells of unconventional reservoirs can be attributed to the Noordbergum/Mandel-Cryer or reverse-water-level effects. In soft poroelastic rocks, pressure depletion in certain parts of a reservoir can lead to a pressure escalation in a non-drained region. This can be attributed to stress transfer and high-low permeability contrast between drained and undrained parts of a reservoir.

Based on these principles, simulation-based type curves can be used to estimate the magnitude and duration of pressure escalation in the reservoir due to any given applied wellbore drawdown. Type curves for different mechanical and flow property configurations are generated using stochastic coupled flow and geomechanics simulations of the well setup. This can help reservoir engineers make more reliable estimates of the reservoir pressure distribution and therefore of the expected fluid pressure, temperature, and volume (PVT) variations. If the pressure escalation provided by soft and low perm rock is high enough, the fluid will continue to stay in a single phase in the reservoir for an extended duration thereby providing a constant CGR response at the surface for a longer duration than expected.

It has been observed that pore pressure can escalate unexpectedly near certain UR producing wells. This pressure escalation in turn can lead to an extended period of constant CGR. This is similar to providing pressure support to producing wells in conventional reservoirs using mechanisms such as water or gas injection. However, rather than relying on hydraulic pressure support (possible in high permeability reservoirs), the pressure support in low permeability reservoirs should be poromechanic in nature, due to overburden load sharing.

FIG. 1 illustrates a pressure escalation that can take place during fluid drainage in a low permeability, low Young's modulus environment. The three curves ("A", "B", and "C") correspond to the pore pressure variations in three different poromechanic property experimental setups. These curves can be described by the following relationship:

$$T = \frac{C_v t}{a^2} = \frac{E'k(1-v)t}{(1+v)(1-2v)\gamma_w a^2} \qquad (1)$$

where T is dimensionless time, $C_v$ is coefficient of consolidation, t is consolidation time, k is coefficient of permeability, a is drainage distance, E' is Young's modulus of soil, v is Poisson's ratio, $\gamma_w$ is unit weight of water. Equation (1) shows that lower Poisson Ratio, lower Young's Modulus, and lower permeability all lead to higher t (i.e., duration of pressure escalation).

Figure 2:
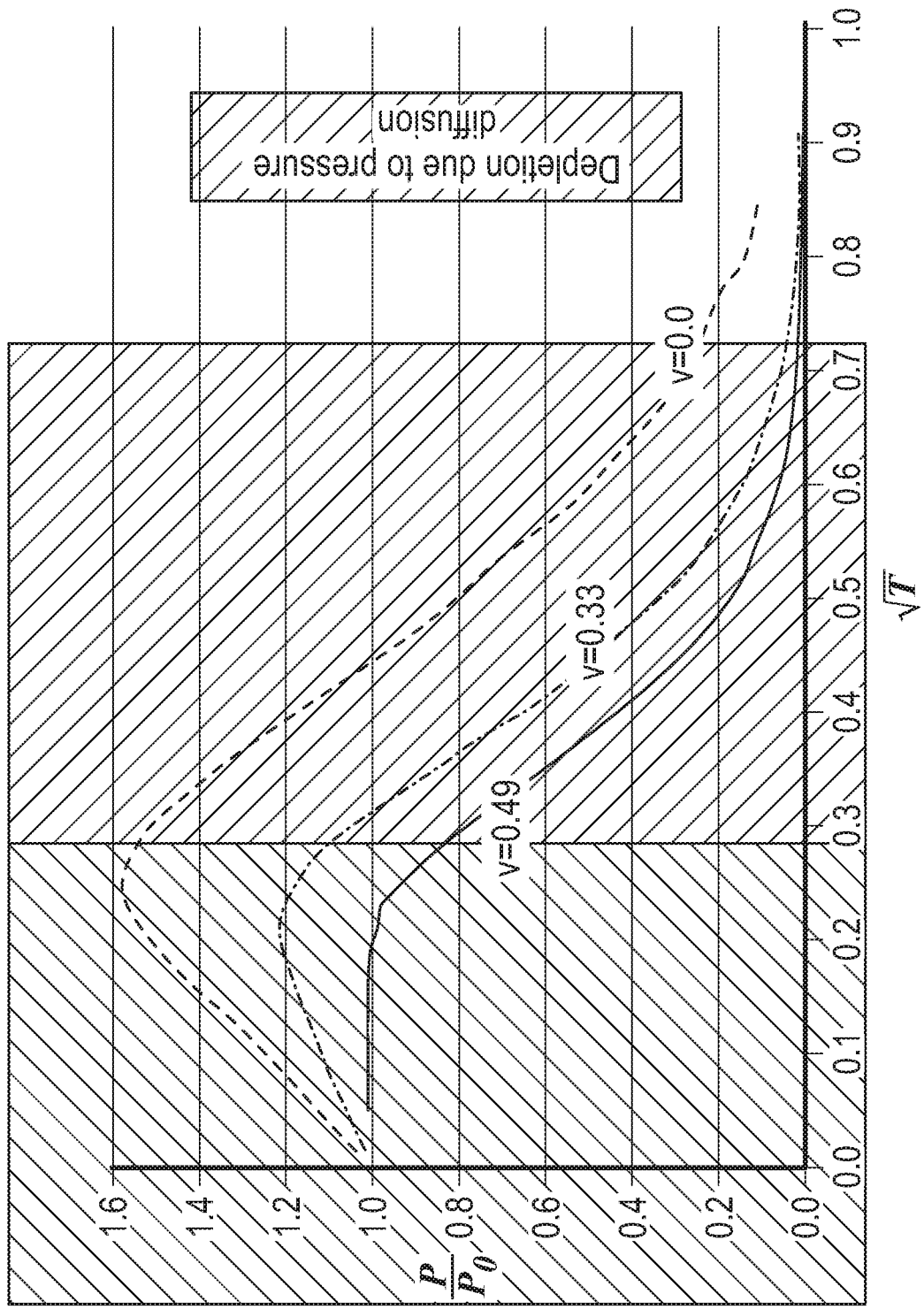
FIG. 2 illustrates pressure escalation and pressure depletion according to one or more embodiments of the present invention.

FIG. 2 divides the graph in FIG. 1 into a escalation stage (left) and a depletion stage (right). The pressure escalation is most pronounced in curve A followed by curve B. Curve C does not have the obvious local peak of curves A and B. Without being limited by theory, the pressure escalation is due to lithostatic load sharing. In other words, as fluid is drained in the producing well, other parts of the formation are required to take on more of the overburden load. Certain areas of the formation (e.g., adjacent and below to the drained reservoir volume) will take on greater portions of the load corresponding to higher pressure escalation peaks. This poromechanic effect takes a discernable amount of time to propagate throughout the reservoir.

Figure 3A:
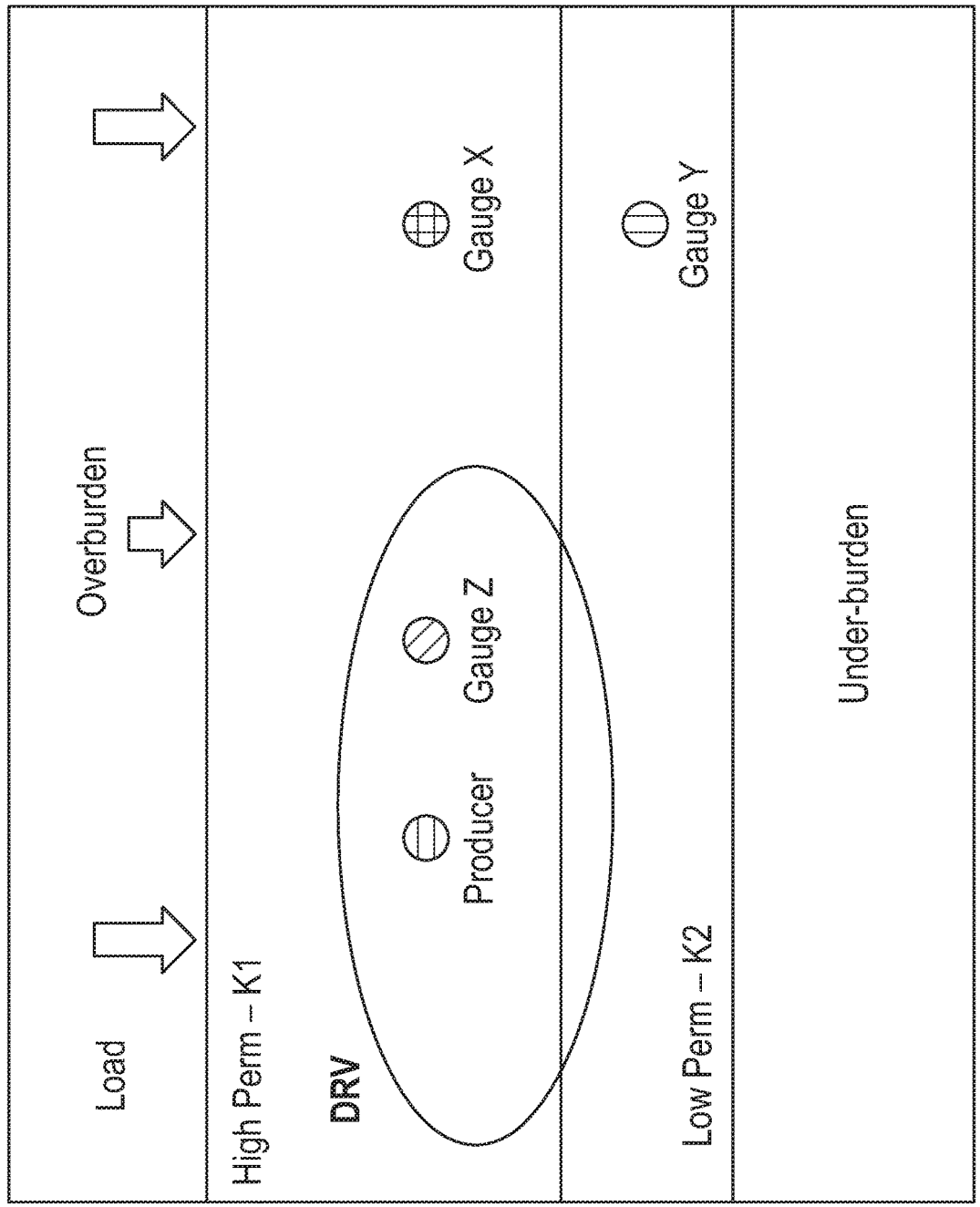
FIG. 3A illustrates a schematic showing a configuration of a production well (Producer) and multiple pressure gauges (Gauges X, Y, Z) according to one or more embodiments of the present invention.

FIG. 3A is a schematic diagram representing the cross section of an unconventional reservoir with a producer well going into the plane in the reservoir target directly below the overburden. As shown, the reservoir includes a high permeability region (K1) and a lower permeability region (K2). Also shown, is the producing well (producer) and pressure gauges X, Y, and Z.

Figure 3B:
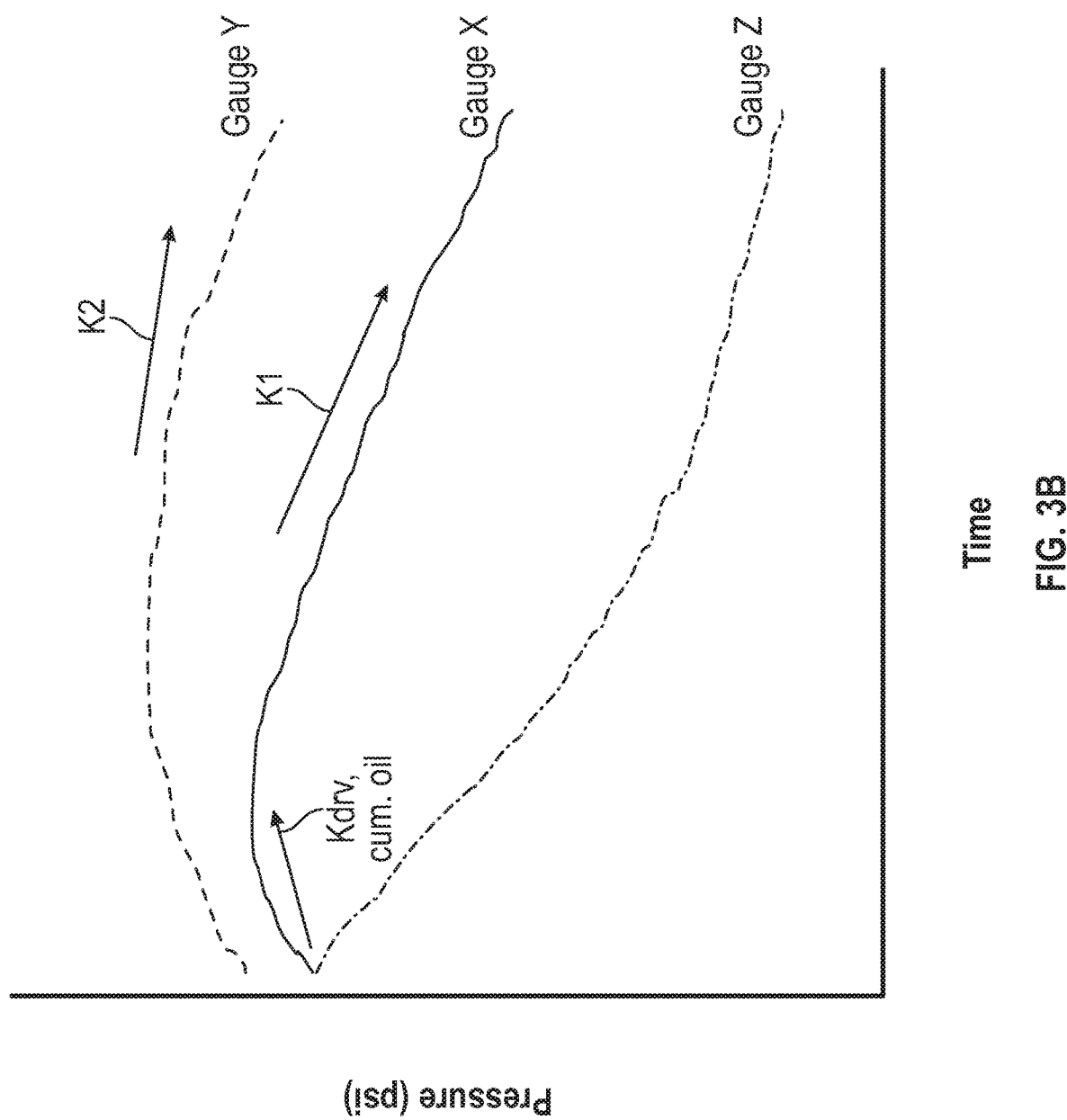
FIG. 3B summarizes pressure changes measured at the pressure gauges.

In one embodiment, gauges X, Y, and Z are installed in separate offset wells. They may also be located in different sections of a single well or combination of vertical and horizontal wells or combination of producing (active) and monitoring (passive) wells. Gauge Z is located closest to the producing well, followed by gauge X and then gauge Y. After stimulation and production from the reservoir through the producer well, pressure measurements were taken in each offset location X, Y, Z. FIG. 3B shows the measured pore pressure as a function of time. In comparing the three pressure gauge measurements, readings from gauge Y show the largest pressure escalation. This is due, at least partly, to gauge Y being located in a lower permeability region (which prevents pressure from dissipating quickly) and being subjected comparatively to the most lithostatic pressure from above.

Gauge X experiences the second largest pressure escalation. The pressure escalation in gauge X is lower than the escalation in gauge Y for a number of reasons. First, gauge X resides in a higher permeability region as opposed to a low permeability region which prevents excessive pressure build-up by allowing it to dissipate more quickly. Since gauge X is installed closer to the surface, it experiences lower lithostatic pressure as compared to gauge Y.

Out of the three, gauge Z experiences the smallest pressure escalation. Gauge Z resides in the stimulated, high effective permeability region of the reservoir and within a drained reservoir volume (DRV). As such, the present invention can provide type curves for quick estimation of pressure escalation at each gauge location for given mechanical, flow and drawdown conditions. Moreover, the amplitude and duration of the measured pressure escalation can be utilized in inverse models to estimate effective drainage volume and permeability. Since pressure escalation only takes place in the undrained part of the reservoir, a pressure escalation in, for example, an offset well (higher than initial pressure) indicates the depletion extent (DRV) is less than the distance to offset well. This may be the only way of estimating the "effective" producing drainage volume (i.e., DRV extent in an unconventional reservoir). The rate of pressure escalation is indicative of the rate of hydrocarbon depletion, the DRV effective permeability, and the DRV effective Young's modulus. A pressure decrease is indicative of the matrix permeability adjacent to the monitoring location.

As described herein, the term "drained reservoir volume" refers to the portion of the total reservoir that is contacted by or adjacent to hydraulic fracture stimulation from a well and therefore experiences hydrocarbon drainage and pressure depletion with time. Knowledge of the drained reservoir volume helps assess well stacking-spacing distance and reserves estimation.

The present invention can assist in designing an optimal drawdown strategy to maximize well and asset level NPV. One can design well completion or operating strategies (e.g., choke setting, number of induced fractures, number of fracture clusters, choice of stimulation fluid, and/or choice of proppant type) in order to accelerate hydrocarbon recovery, thereby influencing the pressure escalation duration and magnitude.

Knowledge of when and how much the fluid CGR can change due to a poromechanical pressure escalation caused by adjacent well's drainage can assist in improving well productivity forecasts. The engineer can estimate when to expect a multiphase productivity drop and can plan for an appropriate artificial lift solution. Whether a well is within or outside the DRV of another producing well can also help the engineer estimate appropriate spacing-related performance degradation and loss of productivity due to well interference.

EXAMPLE

This example describes coupled fluid flow and poromechanic simulation results that illustrate how various physical parameters can impact the evolution of pore pressure at a given subsurface location away from fluid drainage.

Figure 4:
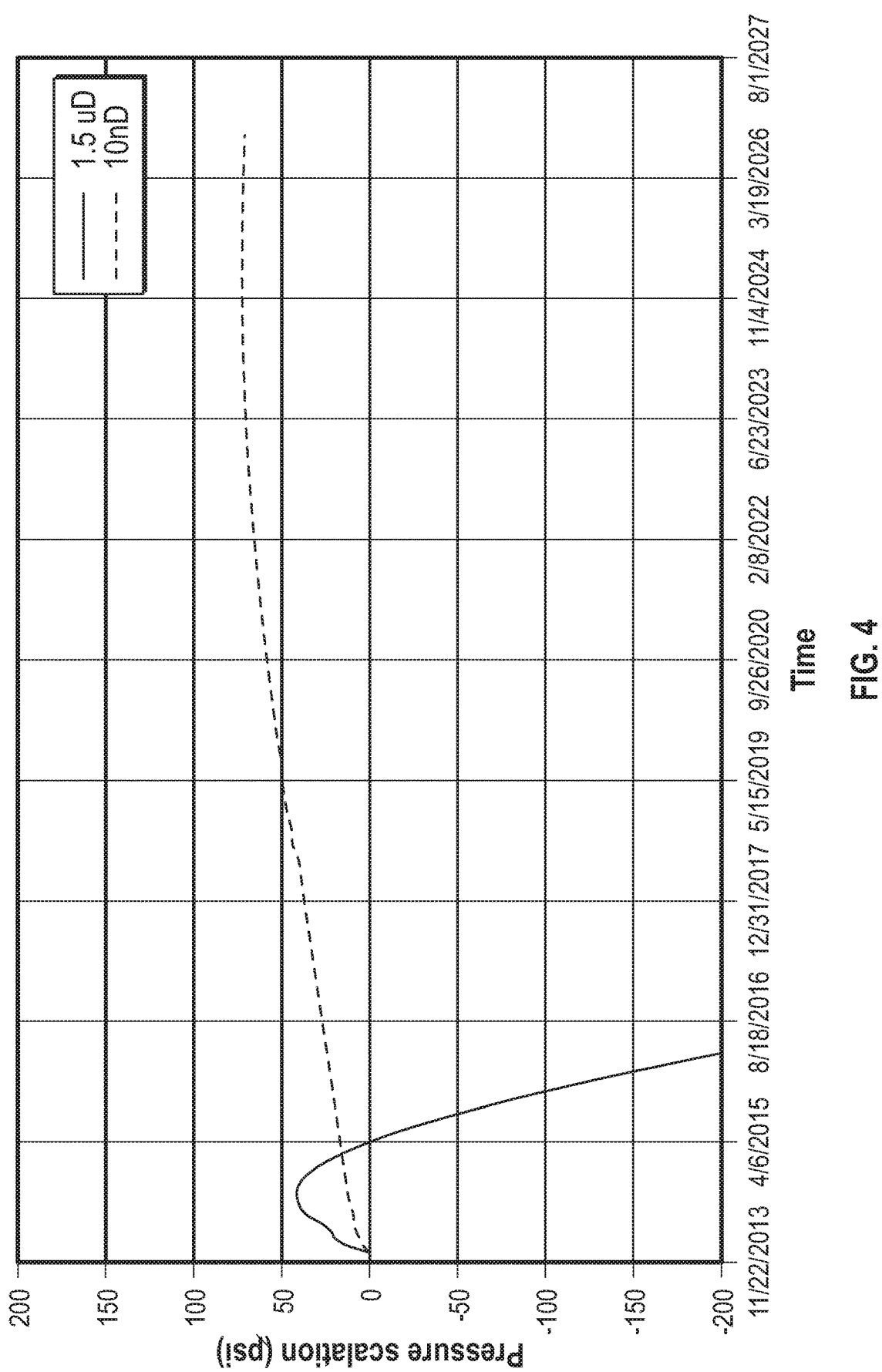
FIG. 4 illustrates a simulated graph as described in the Example.

FIG. 4 shows how permeability can impact pressure. Referring to FIG. 4, one curve (1.5 uD) corresponding to relatively higher permeability shows a pressure escalation lasting about one year and then undergoing pressure depletion. The second curve (10 nD) corresponding to relatively lower permeability shows a more gradual pressure escalation that can last a decade or so.

Figure 5:
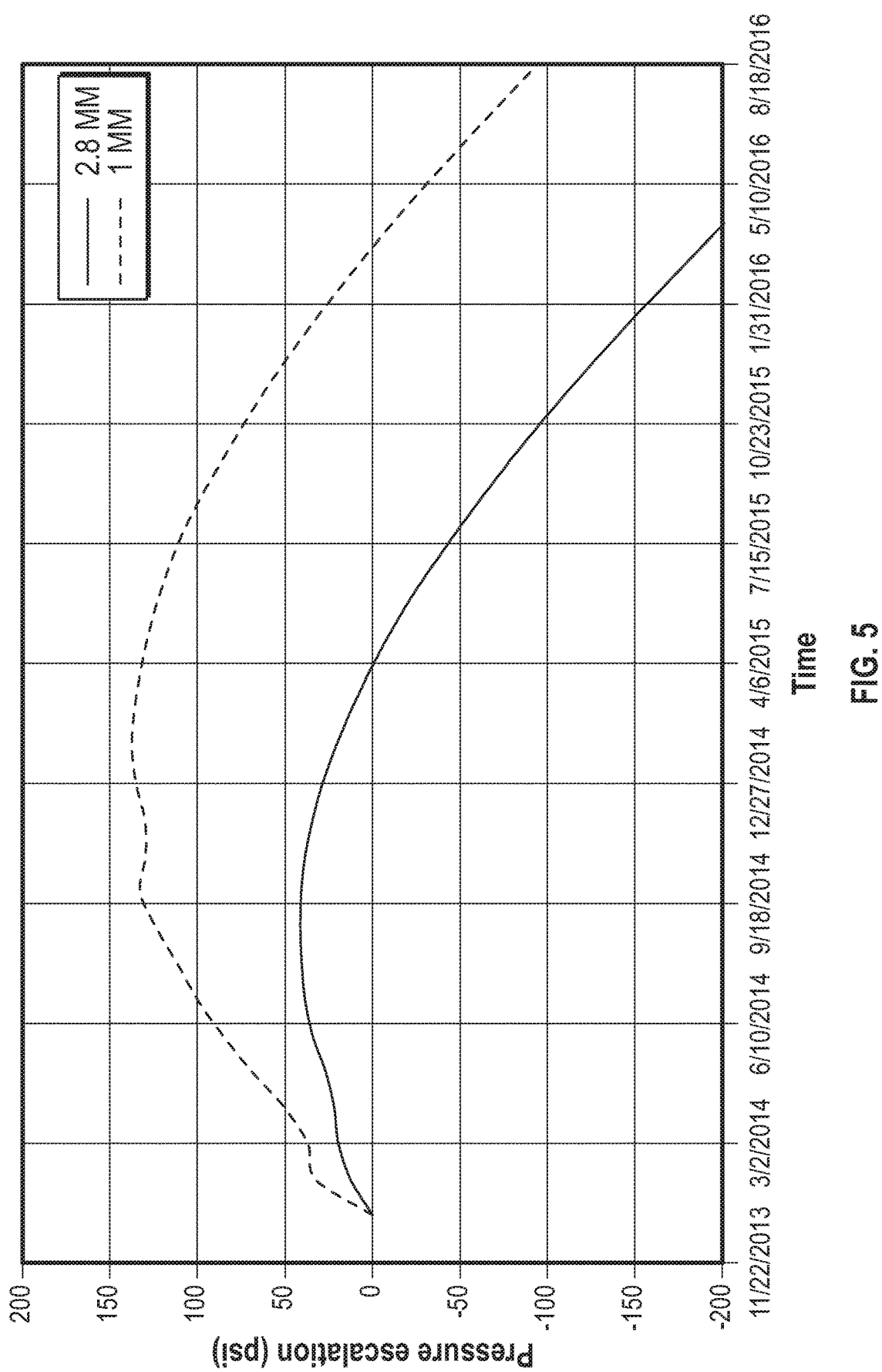
FIG. 5 illustrates a simulated graph as described in the Example.

FIG. 5 shows how the Young's modulus can impact pressure. Referring to FIG. 5, one of the curves (2.8 MM psi) corresponding to a relatively higher Young's modulus shows a more moderate pressure escalation and earlier pressure depletion. The second curve (1 MM) corresponding to a relatively lower Young's modulus shows a higher pressure escalation but the same rate of pressure depletion because the permeability remains the same.

Figure 6:
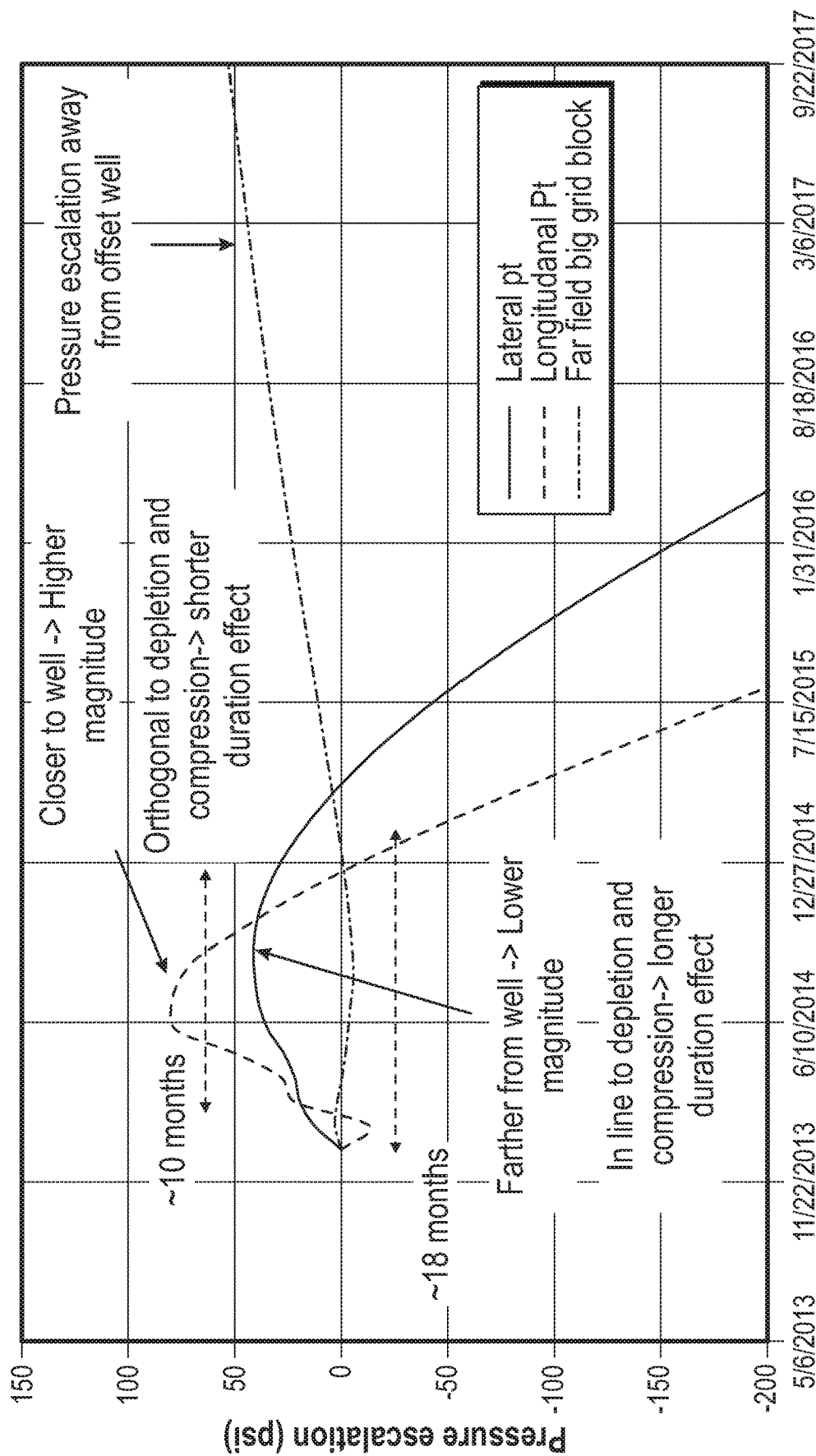
FIG. 6 illustrates simulated graphs as described in the Example.
Figure 7:
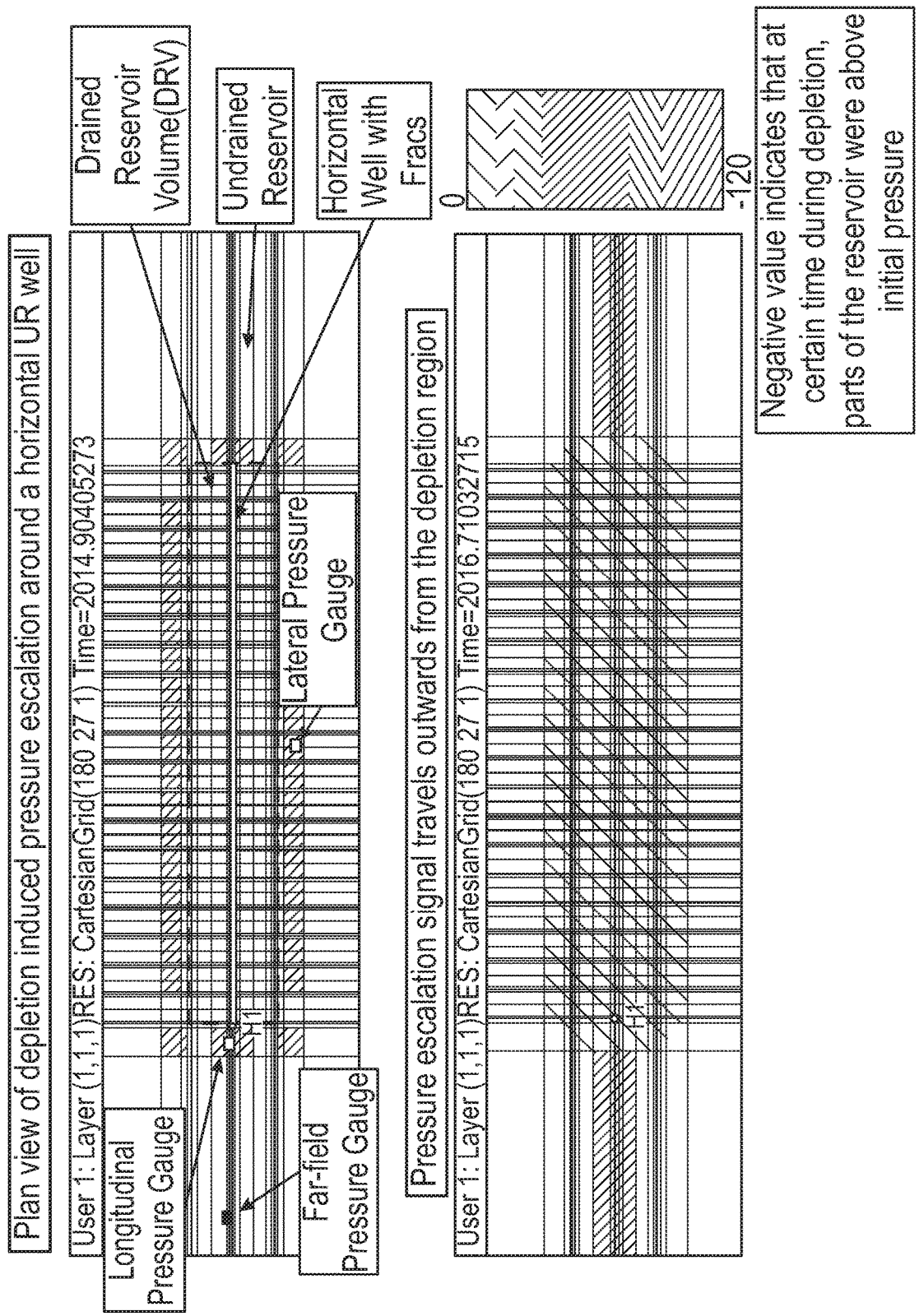
FIG. 7 illustrates a simulated graph as described in the Example.

FIG. 6 and FIG. 7 show simulated results of pressure measurements over time for a reservoir having Km=1.5 uD and YM=2.8 MM psi. As shown, there are 3 curves (FIG. 6) that represent pressure escalation at three different points (FIG. 7) adjacent to the producing well. The lateral point or the solid curve corresponds to a measurement orthogonal to the direction of the horizontal well. The longitudinal point or dashed curve corresponds to measurement along the direction of the wellbore but outside its extent. The final curve in dash-dot corresponds to a far field pressure measurement in the direction of the horizontal lateral further away from the well compared to the longitudinal point. Since it is farther away the pressure escalation signal takes more time to reach its peak value.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method of obtaining hydrocarbon from a reservoir in a subterranean formation, the method comprising:
    a) measuring a poromechanic pressure change due to lithostatic load sharing in the subterranean formation;
    b) mapping the poromechanic pressure change to one or more locations in the subterranean formation;
    c) identifying one or more local pressure peaks in the poromechanic pressure change, wherein the one or more local pressure peaks are each marked by a pressure escalation and subsequent pressure depletion; and
    d) determining one or more regions in the reservoir exhibiting single phase hydrocarbon production.

2. The method of claim 1, wherein the one or more regions of d) experience a delay in hydrocarbon phase change due to the pressure escalation.

3. The method of claim 1, wherein the poromechanic pressure increase is at least partly due to the Noordbergum effect.

4. The method of claim 1, further comprising:
    e) extending duration of the single phase hydrocarbon production by increasing the rate of drainage in at least a portion of the reservoir.

5. The method of claim 1, further comprising:
estimating the duration of the single phase production.

6. The method of claim 1, wherein a pressure escalation in a production period is at least partly due to compression in an undrained part of the hydrocarbon reservoir.

7. The method of claim 4, wherein increasing rate of drainage is performed by adjusting one or more producing well parameters selected from the group consisting of: choke setting, number of induced fractures, number of fracture clusters, choice of stimulation fluid, and choice of proppant type.

8. The method of claim 1, wherein an offset production experiences extended duration of stable surface condensate-gas ratio due to load-sharing pressure support.

9. The method of claim 1, further comprising:
generating geomechanics simulation model-based type-curves to estimate the pressure escalation and duration for given reservoir properties and pressure depletion; and
estimating rock layer stiffness and permeability based on a known pressure escalation and duration, using the geomechanics stimulation models.

10. The method of claim 1, wherein the one or more regions in the reservoir includes an offset well.

11. The method of claim 1, further comprising:
mapping a pressure escalation in an inter-frac region of the reservoir due to severe near-fracture drainage.

12. The method of claim 1, further comprising:
recovering hydrocarbons from a refrac well wherein a new fracture experiences the pressure escalation in the inter-frac region.

13. A method for estimating the duration of single phase hydrocarbon production from a reservoir in a subterranean formation, the method comprising:
a) measuring a poromechanic pressure change due to lithostatic load sharing in the subterranean formation;
b) mapping the poromechanic pressure change to one or more locations in the subterranean formation;
c) identifying one or more local pressure peaks in the poromechanic pressure change, wherein the one or more local pressure peaks are each marked by a pressure escalation and subsequent pressure depletion;
d) determining one or more regions in the reservoir exhibiting single phase hydrocarbon production; and
e) simulating extension of the duration of the single phase hydrocarbon production by increasing the rate of drainage in at least a portion of the reservoir.

14. The method of claim 13, wherein increasing the rate of drainage is performed by adjusting one or more producing well parameters selected form the group consisting of: choke setting, number of induced fractures, number of fracture clusters, choice of simulation fluid, and choice of proppant type.

15. The method of claim 13, further comprising:
generating geomechanics stimulation model-based type-curves to estimate the pressure escalation and duration for given reservoir properties and pressure depletion; and
estimating rock layer stiffness and permeability based on a known pressure escalation and duration, using the geomechanics stimulation models.

16. The method of claim 13, further comprising determining an effective permeability and stiffness of the drained reservoir volume (DRV) based on an analysis of the pressure escalation.

17. The method of claim 16 further comprising determining an optimal well spacing based on the DRV dimensions and effective permeability.

18. The method of claim 13, further comprising determining an optimal well stacking based on the DRV dimensions and effective permeability.

* * * * *